United States Patent [19]

Frenier et al.

[11] Patent Number: 4,734,259

[45] Date of Patent: Mar. 29, 1988

[54] MIXTURES OF α,β-UNSATURATED ALDEHIDES AND SURFACE ACTIVE AGENTS USED AS CORROSION INHIBITORS IN AQUEOUS FLUIDS

[75] Inventors: Wayne W. Frenier, Tulsa; Frederick B. Growcock, Broken Arrow, both of Okla.

[73] Assignee: Dowell Schlumberger Incorporated, Tulsa, Okla.

[21] Appl. No.: 801,123

[22] Filed: Nov. 22, 1985

[51] Int. Cl.$^4$ .......................... C23F 11/04; C09K 3/00
[52] U.S. Cl. .......................... 422/16; 422/12; 422/13; 252/8.555; 252/390; 252/391; 252/396
[58] Field of Search ...................... 252/8.555, 390, 391, 252/396; 422/12, 13, 16

[56] References Cited

U.S. PATENT DOCUMENTS

| | | | |
|---|---|---|---|
| 3,077,454 | 2/1963 | Monroe et al. | 252/148 |
| 3,530,059 | 9/1970 | Foroulis | 208/47 |
| 3,537,974 | 11/1970 | Foroulis | 208/47 |
| 3,589,860 | 6/1971 | Foroulis | 472/9 |
| 3,854,959 | 12/1974 | Costain et al. | 106/14.15 |
| 4,493,775 | 1/1985 | Coffey et al. | 252/8.553 |
| 4,525,296 | 6/1985 | Quinlan | 252/390 X |

OTHER PUBLICATIONS

Desai et al., "Corrosion Inhibitors for Aluminum in Hydrochloric Acid", *Anti-Corrosion* (May 1972) pp. 12-15.
CA 74:78081Z and CA 74:82362J.
*Corrosion 85*, Paper No. 188, dated Mar. 25-29, 1985 (Nace copyright).
Aromatic Aldehydes as Corrosion Inhibitors for Aluminium 56S in Hydrochloric Acid"-by Desai et al., pp. 31-33, *J. Electrochemical Soc. India* (1981).
"Corrosion Inhibitors, Study of Their Activity Mechanism", by G. Hugel, presented at 10th Meeting of the European Corrosion Federation, Ferrara (Italy) Sep. 28-Oct. 1, 1960.
Dissertation by B. Olbertz-"Research on the Influence of Inhibitors on Corrosion and Hydrogen Absorption by Steel in Hydrochloric Acid", 2-11-80.

*Primary Examiner*—Matthew A. Thexton
*Attorney, Agent, or Firm*—S. A. Littlefield

[57] ABSTRACT

A composition and method for inhibiting the attack of aqueous corrosive fluids on metal by contacting the metal with a composition including an α,β-unsaturated aldehyde and a surfactant.

30 Claims, No Drawings

MIXTURES OF α,β-UNSATURATED ALDEHIDES AND SURFACE ACTIVE AGENTS USED AS CORROSION INHIBITORS IN AQUEOUS FLUIDS

BACKGROUND OF THE INVENTION

1. Field of the Invention

This invention relates to novel corrosion inhibiting compositions and to processes of using them. More particularly, this invention relates to novel corrosion-inhibiting compositions which reduce the attack of various aqueous fluids, including aqueous acids, alkaline solutions and heavy brines, on ferrous metals, such as iron and steel, and to processes of using such compositions.

2. Description of the Prior Art

Aqueous acids, alkaline solutions and heavy brines are known to damage ferrous metal surfaces. These corrosive substances are often found in or added to crude oils and intermediate or final products made therefrom. In addition, when exploring for and recovering petroleum from underground fields it is common to "acidize" new and producing wells with aqueous solutions of strong acids. This of course can lead to corrosion of well casings, pumps and other ferrous metal-containing equipment.

Similarly, acidic materials are often generated in equipment used in processing or transporting petroleum refinery streams, where water vapor can combine with acidic gases evolved during refinery operations to yield corrosive gases.

Various materials for inhibiting the attack of corrosive fluids on ferrous metals are known, but few provide satisfactory protection. Arsenic and various arsenic compounds, for example, have been used, notwithstanding their toxicity, as acid corrosion inhibitors for ferrous metals. However, the adverse effect arsenic and arsenic compounds have on catalysts used in petroleum refineries, coupled with their toxicity, has lead the industry to search for corrosion inhibitors which are free of such undesirable properties.

Aldehyde-Containing Corrosion-Inhibitors

U.S. Pat. No. 3,077,454, issued Feb. 12, 1963 to Monroe et al and assigned to The Dow Chemical Company, discloses inhibitors of aqueous acid attack on metals which comprise certain active nitrogen-containing compounds, e.g., primary and secondary amines, admixed with ketones and aliphatic or aromatic aldehydes.

Three patents issued to Foroulis and assigned to Esso Research and Engineering Company, U.S. Pat. No. 3,530,059, issued Sept. 22, 1970, U.S. Pat. No. 3,537,974, issued Nov. 3, 1970 and U.S. Pat. No. 3,589,860, issued June 29, 1971, all disclose the use of aldehydes to prevent corrosion of metals such as steel by aqueous acidic solutions. Aralkyl aldehydes in which the aldehyde group is attached to the aliphatic side chain are the corrosion-preventing aldehydes disclosed in the first of these patents. The second Foroulis patent discloses alkoxy-substituted benzaldehydes, such as p-methoxybenzaldehyde, as corrosion inhibitors, while the third Foroulis patent discloses the use of cinnamic aldehyde (i.e., cinnamaldehyde) and certain derivatives thereof for this purpose.

U.S. Pat. No. 3,854,959 issued Dec. 17, 1974 to Costain et al and assigned to ICI, discloses mixtures of a nitrile or an oxime with aldehydes as corrosion inhibitors for steel.

A paper by Hugel entitled "Corrosion Inhibitors; Study of Their Active Mechanism", delivered at the Tenth Meeting of the European Corrosion Federation, Ferrara, Italy, Sept. 28–Oct. 1, 1960, discloses that a number of aldehydes have been tested for corrosion inhibition (see, for example, Table I).

A paper by Derarajan et al entitled "Aldehydes as Inhibitors of Corrosion of Mild Steel in Acids", *Trans. SAEST*, 19, 1, 71–81 (1984) states (at page 75) that "(i)n acid solutions cinnamaldehyde is found to exhibit the highest efficiency in reducing corrosion."

A paper by Rocchini entitled "A Study of the Acid Cleaning of a Steam Generator Performed with a Pilot Plant—Part I" delivered at CORROSION '85, Boston, Mass. Mar. 25–29, 1985, discloses at page 188/7 that a commercial inhibitor, BORG p 16, is derived from Rodine 213, with the addition of cinnamicaldehyde to improve its thermal stability.

Surfactant-Containing Corrosion-Inhibitors

Fedorov et al, *Zashch. Metal.*, 1971, 7(1), 73-6, CA 74, 82362J, discloses that certain organic thiocyanates and indole derivatives which behave as surface active agents have a corrosion inhibiting effect on steel in acid solutions.

U.S. Pat. No. 4,493,775, issued Jan. 15, 1985 to Coffey et al and assigned to The Dow Chemical Company, discloses corrosion-inhibiting formulations in which formaldehyde is both a reactant and an unreacted constituent (present in excess). These formulations may, but need not, also contain a surfactant.

Pending U.S. patent application Ser. No. 06/765,890, filed Aug. 14, 1985, by W. Frenier, V. R. Lopp, F. Growcock and B. Dixon, discloses and claims inhibiting corrosion of iron and steel in contact with aqueous acids by using compositions which contain an alkenylphenone derivative and which may contain, but need not contain, a surfactant as well.

SUMMARY OF THE INVENTION

It has now been discovered that certain aldehydes, in combination with a surfactant, provide corrosion-inhibiting compositions which reduce the attack of various aqueous fluids, such as aqueous acids, alkaline solutions and heavy brines, on ferrous metals, such as iron and steel, as well as on nonferrous metals, such as aluminum, zinc and copper. Surprisingly, such aldehyde and surfactant containing corrosion-inhibiting compositions provide greater and more reliable corrosion inhibition than do compositions containing the aldehydes alone.

It is, therefore, an object of this invention to provide improved compositions for inhibiting metal corrosion caused by corrosive aqueous fluids.

Another object of the invention is to provide improved compositions for inhibiting ferrous metal corrosion caused by corrosive aqueous fluids, which corrosion-inhibiting compositions comprise certain aldehydes and a surfactant.

It is also an object of this invention to provide an improved method of inhibiting ferrous metal corrosion caused by corrosive aqueous fluids.

A further object of the invention is to provide an improved method of inhibiting ferrous metal corrosion caused by aqueous fluids which comprises mixing certain aldehydes and a surfactant together with such corrosive aqueous fluids.

These and other objects, as well as the nature, scope and utilization of the invention, will become readily apparent to those skilled in the art from the following description and the appended claims.

DETAILED DESCRIPTION OF THE INVENTION

The Aldehydes

The aldehydes used in the novel corrosion-inhibiting compositions of the present invention are $\alpha,\beta$-unsaturated aldehydes having the general formula:

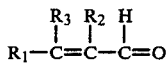

$$R_1-\underset{\underset{R_3}{|}}{C}=\underset{\underset{R_2}{|}}{C}-\underset{\underset{H}{|}}{C}=O \quad (I)$$

wherein:

$R_1$ represents a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, e.g., phenyl, benzyl or the like, a substituted aryl group containing one or more non-interfering substitutents, or a non-interfering substitutent per se, $R_2$ represents hydrogen, a saturated or unsaturated aliphatic hydrocarbon group containing from 1 to about 5 carbon atoms, a substituted saturated aliphatic hydrocarbon group containing from 1 to about 5 carbon atoms and also containing one or more noninterfering substitutents, an aryl group, a substituted aryl group containing one or more non-interfering substitutents, or a non-interfering substituent per se, and $R_3$ represents hydrogen, a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, with the total number of carbon atoms in substituents represented by $R_1$, $R_2$ and $R_3$ ranging from 1 to about 16, and preferably from about 5 to about 10.

Non-interfering substituents referred to above which replace hydrogen on the $\alpha$- and $\beta$-carbon atoms of the aldehydes of formula I above or which are found in hydrocarbon substituents which replace hydrogen on these carbon atoms and have no adverse effect on the corrosion inhibition are provided by the novel compositions of this invention. They include, for example, lower alkyl (containing from 1 to about 4 carbon atoms), lower alkoxy (containing from 1 to about 4 carbon atoms), halo, i.e., fluoro, chloro, bromo or iodo, hydroxyl, dialkylamino, cyano, thiocyano, N,N-dialkylcarbamoylthio and nitro substituents.

Included among the $\alpha,\beta$-unsaturated aldehydes represented by formula I above are
crotonaldehyde,
2-hexenal,
2-heptenal,
2-octenal,
2-nonenal,
2-decenal,
2-undecenal,
2-dodecenal,
2,4-hexadienal,
2,4-heptadienal,
2,4-octadienal,
2,4-nonadienal,
2,4-decadienal,
2,4-undecadienal,
2,4-dodecadienal,
2,6-dodecadienal,
citral,
1-formyl-[2-(2-methylvinyl)]-2-n-octylethylene,
cinnamaldehyde,
dicinnamaldehyde,
p-hydroxycinnamaldehyde,
p-methylcinnamaldehyde,
p-ethylcinnamaldehyde,
p-methoxycinnamaldehyde,
p-dimethylaminocinnamaldehyde,
p-diethylaminocinnamaldehyde,
p-nitrocinnamaldehyde,
o-nitrocinnamaldehyde,
o-allyloxycinnamaldehyde,
4-(3-propenal)cinnamaldehyde,
p-sodium sulfocinnamaldehyde,
p-trimethylammoniumcinnamaldehyde sulfate,
p-trimethylammoniumcinnamaldehyde o-methylsulfate,
p-thiocyanocinnamaldehyde,
p-(S-acetyl)thiocinnamaldehyde,
p-(S-N,N-dimethylcarbamoylthio)cinnamaldehyde,
p-chlorocinnamaldehyde,
5-phenyl-2,4-pentadienal,
5-(p-methoxyphenyl)-2,4-pentadienal,
2,3-diphenylacrolein,
3,3-diphenylacrolein,
$\alpha$-methylcinnamaldehyde,
$\beta$-methylcinnamaldehyde,
$\alpha$-chlorocinnamaldehyde,
$\alpha$-bromocinnamaldehyde,
$\alpha$-butylcinnamaldehyde,
$\alpha$-amylcinnamaldehyde,
$\alpha$-hexylcinnamaldehyde,
2-(p-methylbenzylidine)decanal,
$\alpha$-bromo-p-cyanocinnamaldehyde,
$\alpha$-ethyl-p-methylcinnamaldehyde,
p-methyl-$\alpha$-pentylcinnamaldehyde,
3,4-dimethoxy-$\alpha$-methylcinnamaldehyde,
$\alpha$-[(4-methylphenyl)methylene]benzeneacetaldehyde,
$\alpha$-(hydroxymethylene)-4-methylbenzylacetaldehyde,
4-chloro-$\alpha$-(hydroxymethylene)benzeneacetaldehyde,
$\alpha$-nonylidenebenzeneacetaldehyde,
and the like, preferably in their trans forms. Transcinnamaldehyde is a preferred aldehyde for use in practicing this invention.

From about 0.01 to about 4 percent by weight, and preferably from about 0.05 to about 1 percent by weight, of one or a mixture of the aldehydes of formula I above, based on the total weight of (1) aldehyde, (2) surfactant and (3) the aqueous fluid being treated, will be employed together with surfactant to inhibit ferrous metal corrosion.

The Surfactants

Anionic, cationic, nonionic and amphoteric surfactants can be used together with the $\alpha,\beta$-unsaturated aldehydes of formula I above in the novel corrosion-inhibiting compositions of this invention.

Anionic surfactants useful in these compositions include
alkyl sulfates, such as the sodium alkyl sulfates prepared by the sulfation of higher alcohols derived from coconut oil or tallow fatty alcohols,
alkyl aryl sulfonates, such as polypropylene benzene sulfonates,
dialkyl sodium sulfosuccinates such as dioctyl sodium sulfosuccinate,
and the like.

Cationic surfactants which can be used in these compositions include nitrogen atom-containing quaternary compounds of the general formula $$(R)_4N^+X^- \qquad (II)$$

wherein the R's represent the same or different long-chain alkyl, cycloalkyl, aryl or heterocyclic groups, and X represents an anion, usually a halide or methosulfate. Among such quaternary compounds are N-alkyl, N-cycloalkyl and N-alkylaryl pyridinium halides such as
N-cyclohexylpyridinium bromide
N-octylpyridinium bromide,
N-nonylpyridinium bromide,
N-decylpyridinium bromide,
N-dodecylpyridinium bromide,
N,N-dodecyldipyridinium dibromide,
N-tetradecylpyridinium bromide,
N-laurylpyridinium chloride,
N-dodecylbenzylpyridinium chloride,
N-dodecylquinolinium bromide quinolinium-(1-naphylenemethyl)chloride
and the like. Other quaternary ammonium compounds include monochloromethylated and bischloromethylated pyridinium halides, ethoxylated and propoxylated quaternary ammonium compounds, sulfated ethoxylates of alkyl phenols and primary and secondary fatty alcohols,
didodecyldimethylammonium chloride,
hexadecylethyldimethylammonium chloride,
2-hydroxy-3-(2-undecylamidoethylamino)-propane-1-triethylammonium hydroxide,
2-hydroxy-3-(2-heptadecylamidoethylamino)-propane-1-triethylammonium hydroxide,
2-hydroxy-3-(2-heptadecylamidoethylamino)-propane-1-triethylammonium hydroxide,
and the like.

The cationic surfactants which can be used also include covalently-bonded nitrogen compounds such as primary amines, secondary amines, or tertiary amines, e.g. dodecyl dimethyl amine.

Nonionic surfactants which can be used in the corrosion-inhibiting compositions of this invention include ethoxylates of alkyl phenols, primary fatty alcohols, secondary fatty alcohols, and the like, including alkyl and alkylaryl polyether alcohols such as the reaction product of trimethyl-1-heptanol with seven mols of ethylene oxide, the reaction products of octyl or nonyl phenol with, e.g., from about 8 to 30 mols or more of ethylene oxide, polyoxyethylenepolyoxypropylene block copolymers, and the like.

Amphoteric surfactants useful in practicing this invention include coco-$\beta$-aminopropionate and the like.

From about 0.005 to about 1 percent by weight, and preferably from about 0.01 to about 0.5 percent by weight, of surfactant, based on the total weight of (1) aldehyde, (2) surfactant and (3) the aqueous fluid being treated, will be employed, together with one or more aldehydes of formula I above, to inhibit ferrous metal corrosion.

Among the corrosive aqueous fluids to which the novel compositions of this invention may be added to inhibit corrosion of ferrous metals such as iron and steel, e.g., oil field goods, mild steel, refinery equipment, etc., in contact with such fluids are:

(1) Aqueous solutions of non-oxidizing mineral or organic acids, for example hydrochloric acid, hydrofluoric acid, sulfuric acid, phosphoric acid, formic acid, acetic acid, citric acid, and mixtures thereof. Such acid solutions may also contain chelating agents, such as EDTA, HEDTA, DPTA and the like. The concentration of non-oxidizing mineral or organic acid in such aqueous solutions may vary from about 0.1 to about 35% by weight, based on the total weight of the solution, and the temperature may vary from ambient up to about 300° F. (150° C.).

(2) Aqueous solutions of alkaline chelating agents, such as the ammonium salts of EDTA, HEDTA, and DPTA. The alkaline chelating agent may be present in such solutions in an amount ranging from about 0.1 to about 15% by weight, based on the total weight of the solution. The temperature of these solutions may vary from ambient up to about 300° F. (150° C.).

(3) Aqueous salt solutions or brines, sometimes characterized as "heavy brines", such as solutions of sodium chloride, potassium chloride, calcium chloride, calcium bromide, zinc bromide and mixtures of such salts. Salt concentrations in such solutions may vary from about 0.1% by weight to saturation, based on the total weight of the solution. These salt solutions may be mixed with an acid gas, such as carbon dioxide or hydrogen sulfide, and with hydrocarbons such as mineral oil, crude oil and refined hydrocarbon products. The temperature of these salt solutions may vary from ambient up to about 400° F. (200° C.).

The corrosion-inhibiting compositions of this invention will ordinarily be employed, in the amounts indicated above, at temperatures preferably ranging from about 20° C. to about 200° C. However, the use of amounts of these corrosion-inhibiting compositions outside the above-disclosed ranges is also within the invention, and will depend on such factors as the particular corrosive liquid being treated, the water solubility of the inhibitor composition, the temperature of the corrosive liquid and its time in contact with the inhibitor composition, etc. The exact amount of inhibitor composition to employ in any particular instance can be determined using the test methods described in the examples below. These examples, which are given solely for purposes of illustration to aid those skilled in the art to more fully understand the invention, should not be considered as expressing limitations unless so set forth in the appended claims. All parts and percentages are by weight, unless otherwise stated.

COMPARATIVE EXAMPLE 1

API grade J55 oil field steel coupons having a surface area of 25.8 cm² were cleaned and weighed. The steel coupons were cleaned in an ultrasonic cleaner containing a chlorinated hydrocarbon solvent, rinsed with acetone, dried and weighed. Each coupon was hung from a glass hook attached to the lid of a 4-oz bottle. The coupon was immersed in 100 ml of 15% (by weight) hydrochloric acid contained in the bottle and then heated at 150° F. (66° C.) in a water bath for 24 hours. At the end of this time, the vessel was cooled, the coupons were removed, cleaned with a soft brush, dried with acetone and reweighed.

The uninhibited corrosion or weight loss rate is calculated from the following equation:

$$\text{weight loss rate}^a = \frac{W^b \times 49.15^c}{t^d \times S.A.^e}$$

$^a$In lb/ft$^2$/day.
$^b$Change in weight of coupon, expressed in grams.
$^c$A unit conversion factor.
$^d$Testing time, expressed in hours.
$^e$Surface area of coupon, expressed in cm$^2$.

The uninhibited corrosion rate was found to be 1.06 lb/ft$^2$/day. When the test was rerun once again using 200 mg of trans-cinnamaldehyde (TCA) the corrosion rate was reduced to 0.075 lb/ft$^2$/day. The percent protection afforded by TCA alone was calculated from the following equation:

$$\text{Percent Protection} = \frac{(\text{Corrosion Rate without Inhibitor} - \text{Corrosion Rate with Inhibitor}) \times 100}{\text{Corrosion Rate without Inhibitor}}$$

Thus, TCA afforded 93% protection for J55 steel. When tested under identical conditions, phenylacetaldehyde 2-phenylpropionaldehyde and 3-phenylprpionaldehyde afforded 0% protection to J55 steel.

The percent protection afforded by TCA along was not, however, reproducible. The results of four identical runs as described above with TCA alone, using J55 steel coupons, at 150° F. (66° C.), 15% HCl, 24-hour tests, are set forth below.

| Inhibitor | [Inhibitor], g/100 ml | % Protection |
| --- | --- | --- |
| TCA | 0.20 | 55.7 |
| TCA | 0.20 | 89.1 |
| TCA | 0.20 | 94.7 |
| TCA | 0.20 | 3.8 |

COMPARATIVE EXAMPLE 2

Using the general method of Comparative Example 1, surfactants were tested in 15% hydrochloric acid at 150° F. (66° C.). Three known surfactant corrosion inhibitors were tested. The three inhibitors were cyclododecylamine (200 mg/100 ml), dodecylpyridinium bromide (50 mg/100 ml), and dodecylquinolinium bromide (50 mg/100 ml).

The percent protection afforded by each of those inhibitors for each type of steel is given in the following table:

TABLE I

| Inhibitor | Percent Protection J55 Steel |
| --- | --- |
| Cyclododecylamine | 75% |
| Dodecylpyridinium bromide (DDPB) | 50% |
| Dodecylquinolinium bromide | 15% |

In an identical test of DDPB at 50 mg/100 mL, conducted at another time, DDPB provided 0% protection for J55 steel

EXAMPLE I

The procedure of Comparative Example 1 was repeated eight times in every respect except for the variations shown in Table II below. Runs 1 and 5 are comparative runs, carried out without surfactant. Runs 2–4 and 6–8 demonstrates the protection afforded to steel samples in a corrosive acidic liquid by TCA in combination with surfactants.

TABLE II

| Run No. | HCl, Weight % | Surfactant | TCA/ Surfactant, mg/100 ml | % Protection |
| --- | --- | --- | --- | --- |
| 1 | 15 | — | 200/0 | 93.0 |
| 2 | 15 | THEO$^1$ | 200/50 | 98.0 |
| 3 | 15 | DDPB$^2$ | 200/50 | 99.2 |
| 4 | 15 | POLYSTEP A18$^3$ | 200/50 | 98.4 |
| 5 | 28 | — | 400/0 | 0 |
| 6 | 28 | THEO | 400/100 | 81.7 |
| 7 | 28 | DDPB | 400/100 | 98.2 |
| 8 | 28 | POLYSTEP A18 | 400/100 | 99.1 |

$^1$Trimethyl-1-heptanol reacted with 7 mols of ethylene oxide.
$^2$Dodecylpyridinium bromide.
$^3$A commercially available sulfonate surfactant; from Stepan Chemical Co., Northfield, IL 60093.

EXAMPLE II

The procedure of Comparative Example 1 was again repeated in every respect, except for the variations shown in Table III below, to demonstrate the protection afforded to J55 steel samples in corrosive acidic liquids by aldehydes coming within the scope of formula I above in combination with surfactants.

TABLE III

| | | PERCENT PROTECTION | |
| --- | --- | --- | --- |
| Run No. | Inhibitor | 15% HCl 200 mg Inhibitor/50 mg DDPB | 28% HCl 400 mg Inhibitor/100 mg DDPB |
| 1 | Crotonaldehyde | 73.8 | 64.8$^b$ |
| 2 | t-2-Hexenal | 92.8 | — |
| 3 | t,t-2,4-Heptadienal | 97.3 | 8.3$^b$ |
| 4 | t-2-Nonenal | 94.7 | — |
| 5 | 5-(p-Methoxyphenyl)-2,4-pentadienal | 94.4 | — |
| 6 | t-Cinnamaldehyde | 99.2 | 98.4 |
| 7 | p-Chlorocinnamaldehyde | 99.4 | 0 |
| 8 | α-Bromo-p-cyanocinnamaldehyde | 75.5 | — |
| 9 | α-Ethyl-p-methylcinnamaldehyde | 95.7$^a$ | — |
| 10 | α-Methylcinnamaldehyde | 96.7$^a$ | — |
| 11 | α-Amylcinnamaldehyde | 93.5$^a$ | — |
| 12 | 2,3-Diphenylacrolein | 95.9$^a$ | — |
| 13 | α-Chlorocinnamaldehyde | 98.4 | 97.7 |
| 14 | α-(Hydroxymethylene)-4-methylbenzeneacetaldehyde | 94.2 | — |
| 15 | α-Ethyl-p-methylcinnamaldehyde | 93.5$^a$ | — |
| 16 | α-[(4-Methylphenyl)-methylene] benzeneacetaldehyde | 37.7$^a$ | — |
| 17 | α-Nonylidenebenzeneacetaldehyde | 91.2$^a$ | — |
| 18 | 3,3-Diphenylacrolein | 84.3 | 7.3 |
| 19 | Citral | 94.4 | — |

$^a$Concentration of inhibitor = 100 mg/100 ml
$^b$Surfactant is THEO.

EXAMPLE III

Control Values for THEO and DDPB
Conditions: 66° C., 24-hr. Tests, J55 Steel

| Material | % HCl | [Material] g/100 ml | % Protection |
| --- | --- | --- | --- |
| THEO | 15 | 0.05 | 0 |
| THEO | 15 | 0.20 | 0 |
| THEO | 28 | 0.10 | 0 |
| DDPB | 15 | 0.05 | 0 |
| DDPB | 15 | 0.20 | 55 |

-continued

| Control Values for THEO and DDPB Conditions: 66° C., 24-hr. Tests, J55 Steel | | | |
|---|---|---|---|
| Material | % HCl | [Material] g/100 ml | % Protection |
| DDPB | 28 | 0.10 | 33 |
| DDPB | 28 | 0.20 | 15 |

EXAMPLE IV

| Effect of Surfactant Concentration and TCA Concentration in 28% HCl J55, 66° C., 24-hr. Tests | | | |
|---|---|---|---|
| Surfactant | [TCA] g/100 ml | [Surfactant] g/100 ml | % Protection |
| POLYSTEP A18 | 0.50 | 0.10 | 99.0 |
| POLYSTEP A18 | 0.45 | 0.40 | 97.4 |
| DDPB | 0.20 | 0.20 | 4.9 |
| DDPB | 0.30 | 0.30 | 65.0 |
| DDPB | 0.40 | — | 0 |
| DDPB | 0.40 | 0.20 | 97.3 |
| DDPB | 0.40 | 0.40 | 95.1 |

EXAMPLE V

| Effect of Acid Concentration & Steel 4.0 hr., 29° C., [TCA] = 0.32 g/100 ml [DDPB] = 0.08 g/100 ml | | | |
|---|---|---|---|
| | % Protection | | |
| % HCl | AISI 1008 | AISI 1026 | API J55 |
| 1 | 99.3 | 99.3 | 90.8 |
| 5 | 99.5 | 99.6 | 93.2 |
| 10 | 99.4 | 99.7 | 94.9 |
| 15 | 99.4 | 99.9 | 96.8 |
| 20 | 99.8 | 99.7 | 97.9 |
| 28 | 99.9 | 99.9 | 98.8 |

EXAMPLE VI

| Effect of Steel 20% HCl, 3.2 hr, 200° F. (93° C.) [TCA] = 0.16 g/100 ml [DDPB] = 0.04 g/100 ml | |
|---|---|
| Steel | % Protection |
| AISI 1008 | 99.7 |
| AISI 1026 | 99.3 |
| API J55 | 98.5 |

The above discussion and related illustrations of this invention are directed primarily to preferred embodiments and practices thereof. It will be readily apparent to those skilled in the art, however, that numerous changes and modifications in the actual implementation of the concepts described herein can readily be made without departing from the spirit and scope of the invention as defined by the following claims.

We claim:

1. A composition for inhibiting the attack of aqueous corrosive fluids on ferrous metal which consists essentially of:
(A) an α,β-unsaturated aldehyde having the general formula:

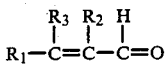

wherein:

$R_1$ represents a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, $R_2$ represents hydrogen, a saturated or unsaturated aliphatic hydrocarbon group containing from 1 to about 5 carbon atoms, a substituted saturated or unsaturated aliphatic hydrocarbon group containing from 1 to about 5 carbon atoms and also containing one or more non-interfering substituents, an aryl group, a substituted aryl group containing one or more non-interfering substituents, or a non-interfering substituent per se, and $R_3$ represents hydrogen, a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, with the total number of carbon atoms in substituents represented by $R_1$, $R_2$ and $R_3$ ranging from 1 to about 16, and (B) a surfactant.

2. A composition as set forth in claim 1 wherein said aldehyde is present in an amount of from about 0.01 to about 4 percent by weight and said surfactant is present in an amount of from about 0.005 to about 1 percent by weight, said percentages being based on the total weight of said aldehyde, said surfactant and an aqueous corrosive fluid.

3. A composition as set forth in claim 2 wherein said aqueous corrosive fluid is an aqueous solution of a non-oxidizing mineral or organic acid, an aqueous solution of an alkaline chelating agent, or an aqueous salt solution.

4. A composition as set forth in claim 3 wherein said aldehyde is t-cinnamaldehyde.

5. A composition as set forth in claim 3 wherein said aldehyde is t-cinnamaldehyde and said surfactant is an anionic surfactant.

6. A composition as set forth in claim 5 wherein said anionic surfactant is an alkyl aryl sulfonate.

7. A composition as set forth in claim 3 wherein said aldehyde is t-cinnamaldehyde and said surfactant is a cationic surfactant.

8. A composition as set forth in claim 7 wherein said surfactant is dodecylpyridinium bromide.

9. A composition as set forth in claim 3 wherein said aldehyde is t-cinnamaldehyde and said surfactant is a nonionic surfactant.

10. A composition as set forth in claim 9 wherein said surfactant is the reaction product of trimethyl-1-heptanol with 7 mols of ethylene oxide.

11. A method for inhibiting the attack of aqueous corrosive fluids on ferrous metal which comprises contacting said ferrous metal with a composition consisting essentially of:

(A) an $\alpha,\beta$-unsaturated aldehyde having the general formula:

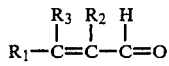

wherein:

$R_1$ represents a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, $R_2$ represents hydrogen, a saturated or unsaturated aliphatic hydrocarbon group containing from 1 to about 5 carbon atoms, a substituted saturated or unsaturated aliphatic hydrocarbon group containing from 1 to about 5 carbon atoms and also containing one or more non-interfering substituents, an aryl group, a substituted aryl group containing one or more non-interfering substituents, or a non-interfering substituent per se, and $R_3$ represents hydrogen, a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, with the total number of carbon atoms in substituents represented by $R_1$, $R_2$ and $R_3$ ranging from 1 to about 16, and (B) a surfactant.

12. The method for inhibiting the attack of aqueous corrosive fluids on ferrous metal set forth in claim 11, wherein said aldehyde is present in an amount of from about 0.01 to about 4 percent by weight and said surfactant is present in an amount of from about 0.005 to about 1 percent by weight, said percentages being based on the total weight of said aldehyde, said surfactant and an aqueous corrosive fluid.

13. The method for inhibiting the attack of aqueous corrosive fluids on ferrous metal set forth in claim 12, wherein said aqueous corrosive fluid is an aqueous solution of a non-oxidizing mineral or organic acid, and aqueous solution of an alkaline chelating agent, or an aqueous salt solution.

14. The method for inhibiting the attack of aqueous corrosive fluids on ferrous metal set forth in claim 13, wherein said aldehyde is t-cinnamaldehyde.

15. The method for inhibiting the attack of aqueous corrosive fluids on ferrous metal set forth in claim 13, wherein said aldehyde is t-cinnamaldehyde and said surfactant is an anionic surfactant.

16. The method for inhibiting the attack of aqueous corrosive fluids on ferrous metal set forth in claim 15, wherein said anionic surfactant is an alkyl aryl sulfonate.

17. The method for inhibiting the attack of aqueous corrosive fluids on ferrous metal set forth in claim 13, wherein said aldehyde is t-cinnamaldehyde and said surfactant is a cationic surfactant.

18. The method for inhibiting the attack of aqueous corrosive fluids on ferrous metal set forth in claim 17, wherein said surfactant is dodecylpyridinium bromide.

19. The method for inhibiting the attack of aqueous corrosive fluids on ferrous metal set forth in claim 13, wherein said aldehyde is t-cinnamaldehyde and said surfactant is a nonionic surfactant.

20. The method for inhibiting the attack of aqueous corrosive fluids on ferrous metal set forth in claim 19, wherein said surfactant is the reaction product of trimethyl-1-heptanol with 7 mols of ethylene oxide.

21. A method for inhibiting the attack of aqueous corrosive fluids on ferrous metal which comprises contacting said ferrous metal with a mixture of at least one aqueous corrosive fluid and a composition consisting essentially of:

(A) an $\alpha,\beta$-unsaturated aldehyde having the general formula:

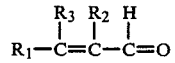

wherein:

$R_1$ represents a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, $R_2$ represents hydrogen, a saturated or unsaturated aliphatic hydrocarbon group containing from 1 to about 5 carbon atoms, a substituted saturated or unsaturated aliphatic hydrocarbon group containing from 1 to about 5 carbon atoms and also containing one or more non-interfering substituents, an aryl group, a substituted aryl group containing one or more non-interfering substituents, or a non-interfering substituent per se, and $R_3$ represents hydrogen, a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent per se, with the total number of carbon atoms in substituents represented by $R_1$, $R_2$ and $R_3$ ranging from 1 to about 16, and (B) a surfactant.

22. The method for inhibiting the attack of aqueous corrosive fluids on ferrous metal set forth in claim 21, wherein said aldehyde is present in an amount of from about 0.05 to about 1 percent by weight and said surfactant is present in an amount of from about 0.01 to about 0.5 percent by weight, said percentages being based on the total weight of said aldehyde, said surfactant and said aqueous corrosive fluid.

23. The method for inhibiting the attack of aqueous corrosive fluids on ferrous metal set forth in claim 22, wherein said aqueous corrosive fluid is an aqueous solution of a non-oxidizing mineral or organic acid, and aqueous solution of an alkaline chelating agent, or an aqueous salt solution.

24. The method for inhibiting the attack of aqueous corrosive fluids on ferrous metal set forth in claim 23, wherein said aldehyde is t-cinnamaldehyde.

25. The method for inhibiting the attack of aqueous corrosive fluids on ferrous metal set forth in claim 23, wherein said aldehyde is t-cinnamaldehyde and said surfactant is an anionic surfactant.

26. The method for inhibiting the attack of aqueous corrosive fluids on ferrous metal set forth in claim 25, wherein said anionic surfactant is an alkyl aryl sulfonate.

27. The method for inhibiting the attack of aqueous corrosive fluids on ferrous metal set forth in claim 23, wherein said aldehyde is t-cinnamaldehyde and said surfactant is a cationic surfactant.

28. The method for inhibiting the attack of aqueous corrosive fluids on ferrous metal set forth in claim 27, wherein said surfactant is dodecylpyridinium bromide.

29. The method for inhibiting the attack of aqueous corrosive fluids on ferrous metal set forth in claim 23, wherein said aldehyde is t-cinnamaldehyde and said surfactant is a nonionic surfactant.

30. The method for inhibiting the attack of aqueous corrosive fluids on ferrous metal set forth in claim 29, wherein said surfactant is the reaction product of trimethyl-1-heptanol with 7 mols of ethylene oxide.

* * * * *